US009349383B2

(12) United States Patent
Hetherington

(10) Patent No.: US 9,349,383 B2
(45) Date of Patent: May 24, 2016

(54) AUDIO BANDWIDTH DEPENDENT NOISE SUPPRESSION

(71) Applicant: QNX Software Systems Limited, Kanata (CA)

(72) Inventor: Phillip Alan Hetherington, Port Moody (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 576 days.

(21) Appl. No.: 13/752,983

(22) Filed: Jan. 29, 2013

(65) Prior Publication Data

US 2014/0211965 A1 Jul. 31, 2014

(51) Int. Cl.
*G06F 17/00* (2006.01)
*G10L 21/0208* (2013.01)

(52) U.S. Cl.
CPC ......... *G10L 21/0208* (2013.01); *H04R 2430/03* (2013.01)

(58) Field of Classification Search
CPC ........................ G10L 21/0208; H04R 2430/03
See application file for complete search history.

(56) References Cited

U.S. PATENT DOCUMENTS 5,012,519 A 4/1991 Adlersberg et al.
7,844,453 B2 11/2010 Hetherington
2005/0111683 A1* 5/2005 Chabries et al. .............. 381/317
2005/0240401 A1* 10/2005 Ebenezer ...................... 704/226
2006/0020450 A1 1/2006 Miseki
2010/0056063 A1* 3/2010 Sudo ............................ 455/63.1
2012/0057711 A1* 3/2012 Makino et al. .................. 381/57

FOREIGN PATENT DOCUMENTS

WO WO 2012158157 A1 * 11/2012 .......... G10L 21/0208

OTHER PUBLICATIONS

Recommendation ITU-T. G.718, "Frame error robust narrow-band and wideband embedded variable bit-rate coding of speech and audio from 8-32 kbitsis," Series G: Transmission Systems and Media, Digital Systems and Networks, International Telecommunication Union, Jun. 2008, 258 pages.

* cited by examiner

*Primary Examiner* — Fan Tsang
*Assistant Examiner* — Eugene Zhao
(74) *Attorney, Agent, or Firm* — Brinks Gilson & Lione

(57) ABSTRACT

A system and method for audio bandwidth dependent noise suppression may detect the audio bandwidth of an audio signal responsive to one or more audio indicators. The audio indicators may include the audio sampling rate and characteristics of an associated compression format. Noise suppression gains may be calculated responsive to the audio signal. Noise suppression gains may mitigate undesirable noise in the reproduced output signal. The noise suppression gains may be modified responsive to the detected audio bandwidth. Less noise reduction may be desirable when more audio bandwidth is available. The modified noise suppression gains may be applied to the audio signal.

21 Claims, 3 Drawing Sheets

AUDIO BANDWIDTH DEPENDENT NOISE SUPPRESSION

BACKGROUND

1. Technical Field

The present disclosure relates to the field of audio noise suppression. In particular, to a system and method for audio bandwidth dependent noise suppression.

2. Related Art

Low-bandwidth (a.k.a. limited-bandwidth) communication systems typically use low-bitrate codecs that may be generally intolerant of noise. Reduction of noise is very important when the communication system is intolerant of noise. Higher (a.k.a. wider) bandwidth communication systems may tolerate more noise and may be more likely to be used for multimedia application that may include music. The application of significant noise reduction in higher bandwidth communications may create more undesirable artifacts than allowing the noise to pass through the system or applying less significant noise reduction.

BRIEF DESCRIPTION OF DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

Figure 1:
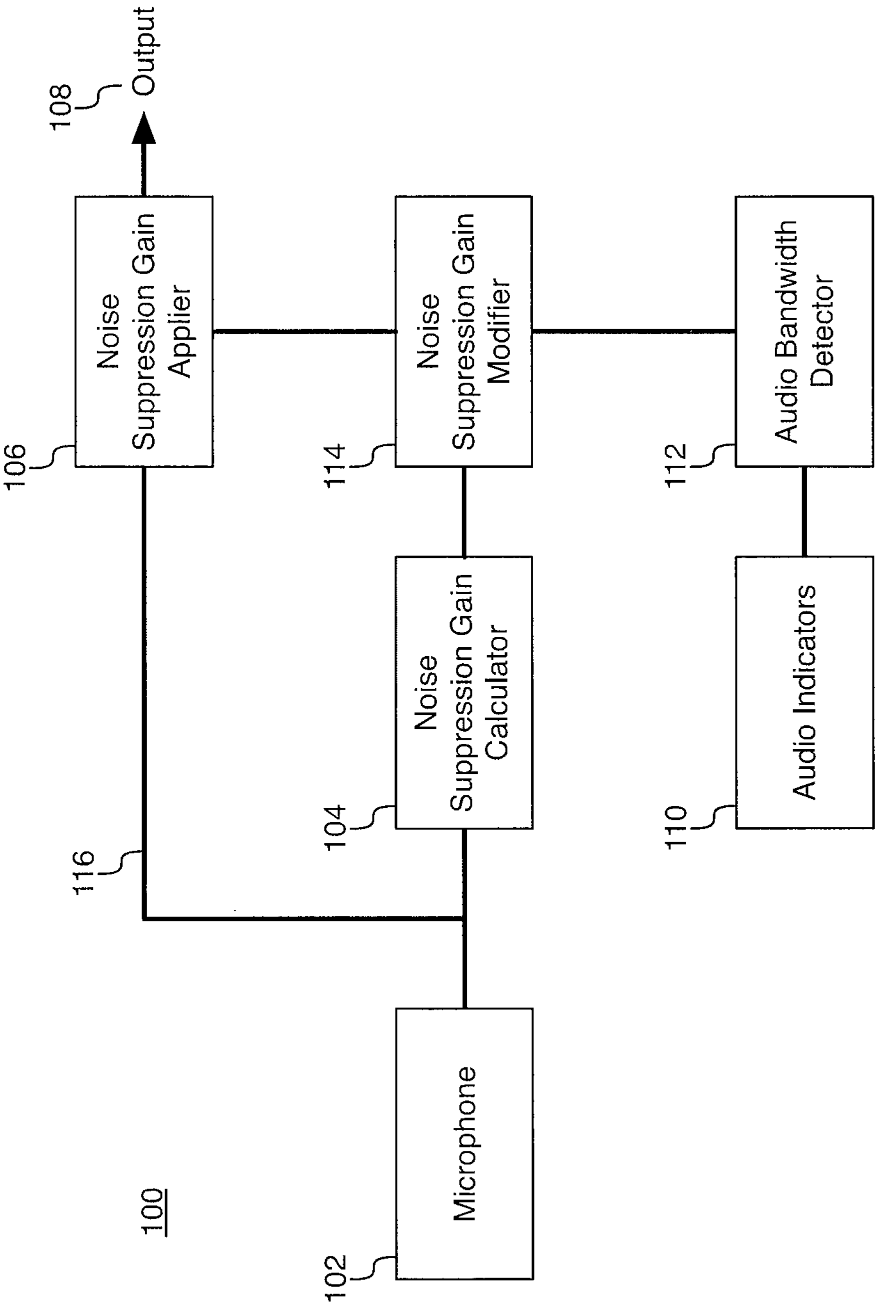
FIG. 1 is a schematic representation of a system for audio bandwidth dependent noise suppression.

A system and method for audio bandwidth dependent noise suppression may detect the audio bandwidth of an audio signal responsive to one or more audio indicators. The audio indicators may include the audio sampling rate and characteristics of an associated compression format. Noise suppression gains may be calculated responsive to the audio bandwidth. Noise suppression gains may mitigate undesirable noise in a reproduced output signal. The noise suppression gains may be modified responsive to the detected audio bandwidth. Less noise reduction may be desirable when more audio bandwidth is available. The modified noise suppression gains may be applied to the audio signal.

In an additive noise model, a noisy audio signal is given by:

$$y(t)=x(t)+n(t) \qquad (1)$$

where x(t) and n(t) denote a clean audio signal, and a noise signal, respectively.

Let $|Y_{i,k}|$, $|X_{i,k}|$, and $|N_{i,k}|$ designate, respectively, the short-time spectral magnitudes of the noisy audio signal, the clean audio signal, and noise signal at the $i^{th}$ frame and the $k^{th}$ frequency bin. A noise reduction process may involve the application of a suppression gain $G_{i,k}$ to each short-time spectral value. For the purpose of noise reduction the clean audio signal and the noise signal may both be estimates because their exact relationship may be unknown. As such, the spectral magnitude of an estimated clean audio signal is given by:

$$|\hat{X}_{i,k}|=G_{i,k}\cdot|Y_{i,k}| \qquad (2)$$

Where $G_{i,k}$ are the noise suppression gains. Various methods are known in the literature to calculate these gains. One example further described below is a recursive Wiener filter.

A typical problem with noise reduction methods is that they create audible artifacts such as musical tones in the resulting signal, the estimated clean audio signal $|\hat{X}_{i,k}|$. These audible artifacts are due to errors in signal estimates that cause further errors in the noise suppression gains. For example, the noise signal $|N_{i,k}|$ can only be estimated. To mitigate or mask the audible artifacts, the noise suppression gains may be floored (e.g. limited or constrained):

$$\hat{G}_{i,k}=\max(\sigma,G_{i,k}) \qquad (3)$$

The parameter σ in (3) is a constant noise floor, which defines a maximum amount of noise attenuation across all frequency bins. For example, when σ is set to 0.3, the system will attenuate the noise by a maximum of 10 dB (decibel) at each frequency bin k. The noise reduction process may produce limited noise suppression gains that will range from 0 dB to 10 dB at each frequency bin k.

The noise reduction method based on the above noise suppression gain limiting applies the same maximum amount of noise attenuation to all frequencies. The constant noise floor in the noise suppression gain limiting may result in good performance for noise reduction in narrowband communication. However, it is not ideal for reducing noise in wideband and full band communications that may utilize less noise suppression gain limiting. Narrowband communication may have, for example, an audio sample rate of 8 kHz with a 4 kHz audio bandwidth. Wideband communication may have, for example, an audio sample rate of 16 kHz with an 8 kHz audio bandwidth. Full band communication may have, for example, an audio sample rate of 32 kHz or greater with a 16 kHz or greater audio bandwidth. The given associated audio sample rate and audio bandwidth for narrowband, wideband and full band are exemplary in nature and the values may be greater or less than the example values.

FIG. 1 is a schematic representation of a system for audio bandwidth dependent noise suppression. A microphone 102 may receive a sound field that is an audible environment associated with the microphones 102. Many audible environments associated with the microphones 102 may include undesirable content that may be mitigated by processing a microphone signal output by the microphone 102 responsive to the received sound field. A noise suppression gain calculator 104 calculates noise suppression gains $G_{i,k}$ using any of various methods that are known in the literature to calculate noise suppression gains. A noise suppression gain applier 106 may apply the noise suppression gains to the microphone signal to mitigate undesirable content. An exemplary noise suppression method is a recursive Wiener filter. The Wiener suppression gain, or noise suppression gain, is defined as:

$$G_{i,k}=\frac{\hat{SNR}_{priori_{i,k}}}{\hat{SNR}_{priori_{i,k}}+1}. \qquad (4)$$

Where $\hat{SNR}_{priori_{i,k}}$ is the a priori SNR estimate and is calculated recursively by:

$$\hat{SNR}_{priori_{i,k}}=G_{i-1,k}\hat{SNR}_{post_{i,k}}-1. \quad (5)$$

$\hat{SNR}_{post_{i,k}}$ is the a posteriori SNR estimate given by:

$$\hat{SNR}_{post_{i,k}}=\frac{|Y_{i,k}|^2}{|\hat{N}_{i,k}|^2}. \quad (6)$$

Where $|\hat{N}_{i,k}|$ is the background noise estimate. The background noise estimate may include signal information from previously processed frames. In one implementation, the spectral magnitude of the background noise may be calculated using the background noise estimation techniques disclosed in U.S. Pat. No. 7,844,453, which is incorporated in its entirety herein by reference, except that in the event of any inconsistent disclosure or definition from the present specification, the disclosure or definition herein shall be deemed to prevail. In other implementations, alternative background noise estimation techniques may be used, such as a noise power estimation technique based on minimum statistics.

One or more audio indicators 110 may indicate the audio bandwidth. One audio indicator 110 of the audio bandwidth may include the audio sample rate of the microphone signal. The audio sampling rate utilized by the noise suppression gain calculator 104 may be an alternative audio indicator 110 as the audio signal 116 may be processed using a sample rate converter. Another audio indicator 110 may include the type of compression format applied to the output signal 108. Compression formats utilized for voice communication may include the $3^{rd}$ Generation Partnership Project (3GPP) Adaptive Multi-Rate (AMR) and $3^{rd}$ Generation Partnership Project 2 (3GPP2) Enhanced Variable Rate Codec B (EVRC-B). Compression formats utilized for general audio communication may include Motion Pictures Expert Group (MPEG) Advanced Audio Coding (AAC). Another audio indicator 110 may include the data rate of the compression format applied to the output signal 108. Another audio indicator 110 may include an energy detector that detects the energy of the audio signal 116 at various frequencies. The energy detector may allow for an estimation of the audio bandwidth of a remote side audio signal. For example, the remote side device may be capable of only narrowband audio signals where it may be desirable to increase the amount of noise reduction. A device that may be capable of limited audio bandwidth, for example narrowband, may select a compression format suitable to the limited audio bandwidth. In this case, narrowband audio may cause a voice codec to be selected including AMR or EVRC-B.

An audio bandwidth detector 112 may detect the audio bandwidth of the audio signal responsive to one or more audio indicators 110. Low-bandwidth audio communications may utilize low-bitrate compression formats, or codecs, including AMR and EVRC that may be intolerant of noise. Noise reduction may be important when codecs are intolerant of noise. Low audio-bandwidth communication may not be used for music or multimedia applications, so again, reduction of noise may be important. Higher bandwidth communication may tolerate more noise and may be more likely to be used for multimedia applications that involve music where less noise reduction may be desirable. The data rate and type of codec used may change the desired about of noise reduction. For example, an audio codec operating at a low data rate may be perceptibly improved by utilizing more noise suppression. In this case, more noise removal may allow the audio codec to allocate more data rate to the desired signal content.

A noise suppression gain modifier 114 may modify the noise suppression gains responsive to the audio bandwidth detected by the audio bandwidth detector 112. The noise suppression gain modifier 114 may, for example, utilize a mechanism described by equation (3) where the audio bandwidth detector 112 may modify the parameter σ. The noise suppression gain modifier 114 may produce limited noise suppression gains that may, for example, have a maximum suppression varying from 10 dB to 12 dB when the audio bandwidth detector 112 detects narrowband audio. The noise suppression gain modifier 114 may produce limited noise suppression gains that may, for example, have a maximum suppression varying from 6 dB to 8 dB when the audio bandwidth detector 112 detects wideband audio. The noise suppression gain modifier 114 may produce limited noise suppression gains that may, for example, have a maximum suppression varying from 0 dB to 6 dB when the audio bandwidth detector 112 detects full band audio. In an alternative example, the audio bandwidth detector 112 may detect full band audio when a low data rate audio codec is utilized and the noise suppression gain modifier 114 may produce limited noise suppression gains that may have a maximum suppression varying from 6 dB to 10 dB.

A subband filter may process the microphone 102 to extract frequency information. The subband filter may be accomplished by various methods, such as a Fast Fourier Transform (FFT), critical filter bank, octave filter band, or one-third octave filter bank. Alternatively, the subband analysis may include a time-based filter bank. The time-based filter bank may be composed of a bank of overlapping bandpass filters, where the center frequencies have non-linear spacing such as octave, $3^{rd}$ octave, bark, mel, or other spacing techniques. The noise suppression gains may be calculated for each frequency bin or band of the subband filter. The resulting noise suppression gains may be filtered, or smoothed, over time and/or frequency.

Many communications channels may have a variable amount of available communication bandwidth over time. As the amount of communication bandwidth increases, the audio bandwidth of a signal carried by a communications channel may increase. The increased audio bandwidth may be utilized to support one or more of a higher audio sampling rate, utilizing a compression format with increased signal quality and a higher data rate for the associated compression format. Conversely, the amount of audio bandwidth may be reduced over time. The reduction in audio bandwidth may result in one or more of a lower audio sampling rate, utilizing a compression format with reduced signal quality and a lower data rate for the associated compression format. The audio bandwidth detector 112 may trigger the noise suppression gain modifier 114 to cause a change in amount of noise suppression responsive to the dynamic bandwidth conditions of the communication channel and thereby the audio bandwidth.

Figure 2:
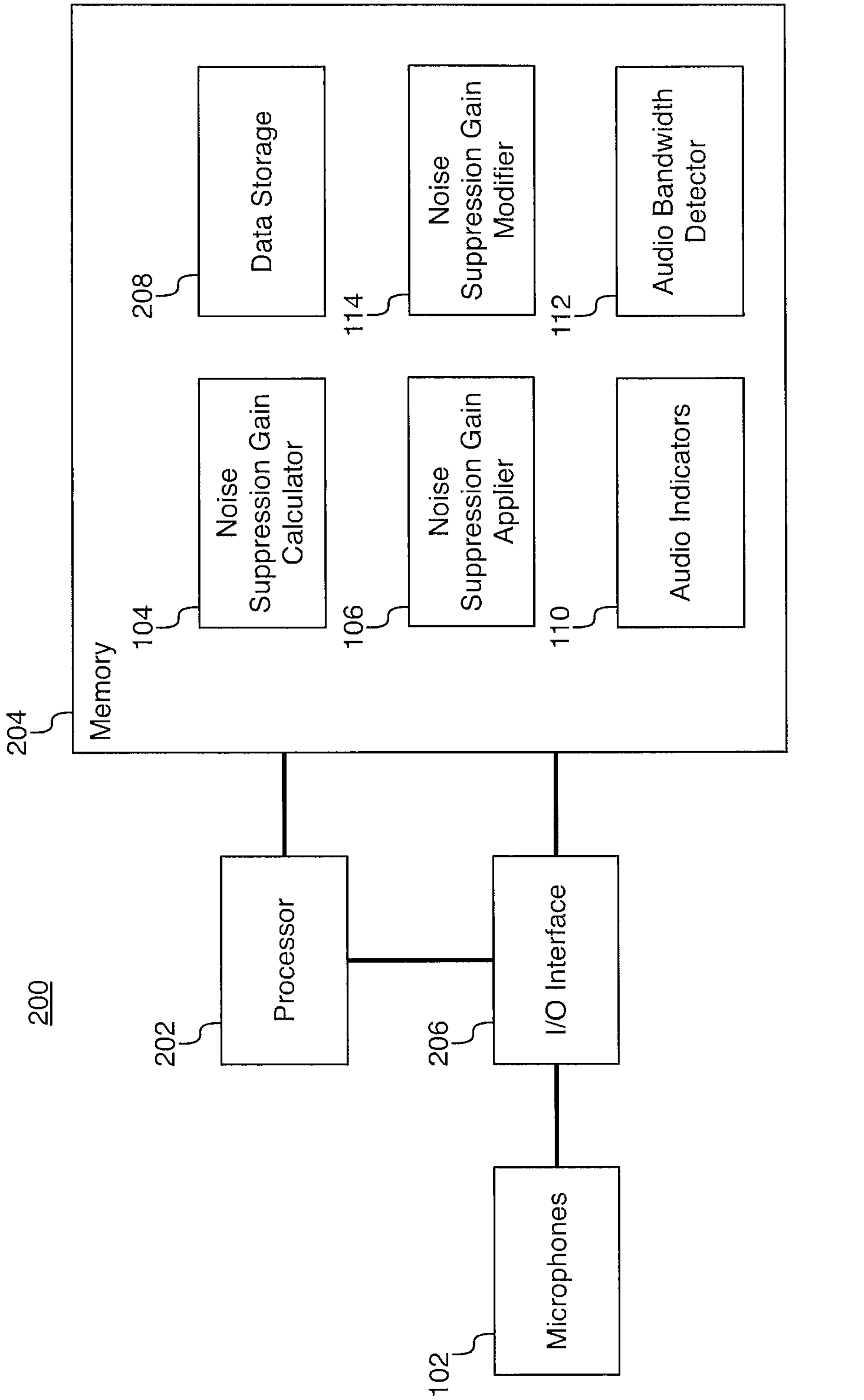
FIG. 2 is a further schematic representation of a system for audio bandwidth dependent noise suppression.
Figure 3:
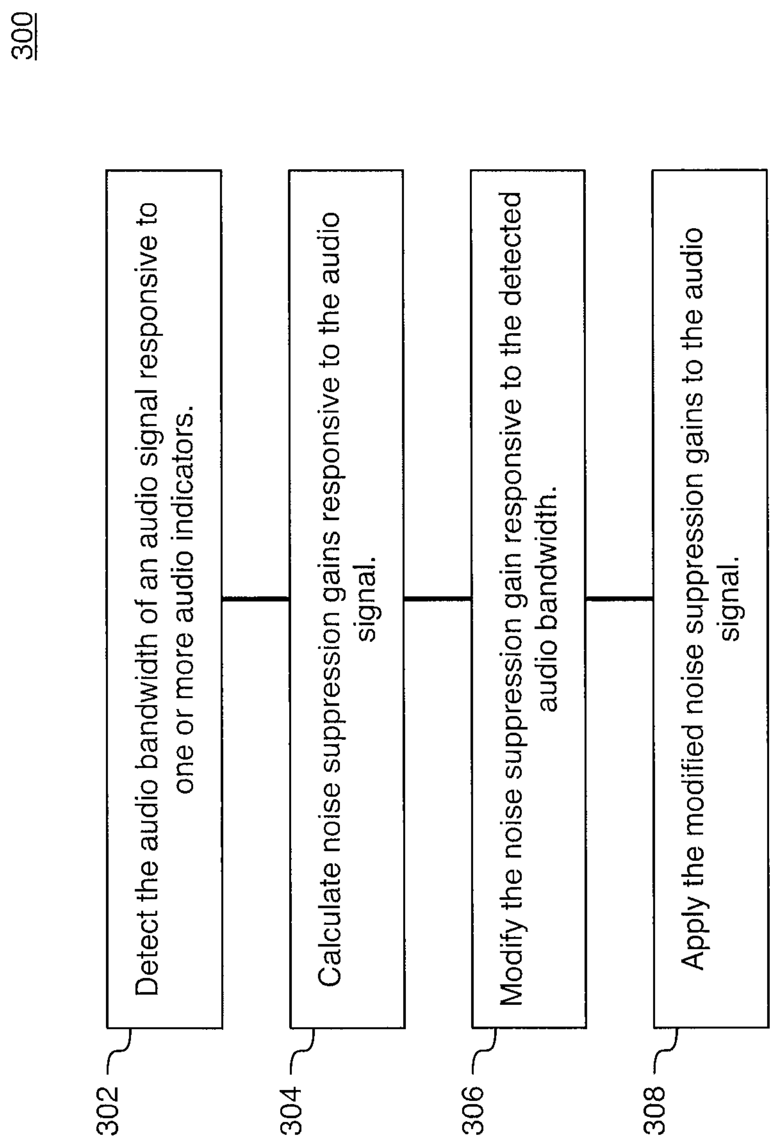
FIG. 3 is flow diagram representing a method for audio bandwidth dependent noise suppression.

FIG. 3 is a representation of a method for audio bandwidth dependent noise suppression. The method 300 may be, for example, implemented using the systems 100 and 200 described herein with reference to FIG. 1 and FIG. 2. The method 300 includes the act of detecting the audio bandwidth of an audio signal responsive to one or more audio indicators 302. Noise suppression gaind may be calculated responsive to the audio signal 304. The noise suppression gains may be modified responsive to the detected audio bandwidth 306. The modified noise suppression gains may be applied to the audio signal 308.

FIG. 2 is a further schematic representation of a system for audio bandwidth dependent noise suppression. The system 200 comprises a processor 202, memory 204 (the contents of which are accessible by the processor 202), one or more microphones 102 and an I/O interface 206. The memory 204 may store instructions which when executed using the process 202 may cause the system 200 to render the functionality associated with audio bandwidth dependent noise suppression as described herein. For example, the memory 204 may store instructions which when executed using the process 202 may cause the system 200 to render the functionality associated with the noise suppression gain calculator module 104, the noise suppression gain applier module 106, the audio indicators 110, the audio bandwidth detector module 112 and the noise suppression gain modifier 114 described herein. In addition, data structures, temporary variables and other information may store data in data storage 208.

The processor 202 may comprise a single processor or multiple processors that may be disposed on a single chip, on multiple devices or distributed over more that one system. The processor 202 may be hardware that executes computer executable instructions or computer code embodied in the memory 204 or in other memory to perform one or more features of the system. The processor 202 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 204 may comprise a device for storing and retrieving data, processor executable instructions, or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the noise suppression gain calculator module 104, the noise suppression gain applier module 106, the audio indicators 110, the audio bandwidth detector module 112 and the noise suppression gain modifier 114 described herein. The computer code may include instructions executable with the processor 202. The computer code may be written in any computer language, such as C, C++, assembly language, channel program code, and/or any combination of computer languages. The memory 204 may store information in data structures including, for example, noise suppression gains and state variables.

The I/O interface 206 may be used to connect devices such as, for example, the one or more microphones 102, and to other components of the system 200.

All of the disclosure, regardless of the particular implementation described, is exemplary in nature, rather than limiting. The system 200 may include more, fewer, or different components than illustrated in FIG. 2. Furthermore, each one of the components of system 200 may include more, fewer, or different elements than is illustrated in FIG. 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for audio bandwidth dependent noise suppression have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A computer implemented method for audio bandwidth dependent noise suppression comprising:

detecting the audio bandwidth of an audio signal received from a microphone responsive to one or more audio indicators through an audio bandwidth detector processor;

calculating noise suppression gains responsive to the audio signal through a noise suppression gain calculator processor;

modifying the noise suppression gains responsive to the detected audio bandwidth through a noise suppression modifier processor; and applying the modified noise suppression gains to the audio signal through a noise suppression gain applier processor;

where the audio indicators comprise one or more of a compression format associated with the audio signal and a data rate associated with the compression format.

2. The method for audio bandwidth dependent noise suppression of claim 1, where the audio indicators comprise one or more of an audio sample rate associated with the audio signal, a compression format associated with the audio signal and a data rate associated with the compression format.

3. The method for audio bandwidth dependent noise suppression of claim 2, where the compression format comprise one or more of Adaptive Multi-Rate, Enhanced Variable Rate Codec B and Motion Pictures Expert Group Advanced Audio Coding.

4. The method for audio bandwidth dependent noise suppression of claim 1, where modifying the noise suppression gains responsive to the detected audio bandwidth comprises limiting the magnitude of the noise suppression gains.

5. The method for audio bandwidth dependent noise suppression of claim 4, where limiting the magnitude of the noise suppression gains comprises increasing a magnitude limit of the noise suppression gains with increased detected audio bandwidth.

6. The method for audio bandwidth dependent noise suppression of claim 5, where the magnitude limit of the noise suppression gains comprises:

10 to 12 dB for detected audio bandwidth up to and including 4 kHz;

6 to 8 dB for detected audio bandwidth from 4 kHz up to and including 8 kHz; and 0 to 6 dB for detected audio bandwidth over 8 kHz.

7. The method for audio bandwidth dependent noise suppression of claim 1, further comprising:

detecting changes in the audio bandwidth of an audio signal responsive to one or more audio indicators;

where modifying the noise suppression gains responsive to the detected audio bandwidth includes the changed detected audio bandwidth.

8. The computer implemented method of claim 1, further comprising generating a set of sub-bands for the audio signal using a subband filter or a Fast Fourier Transform.

9. The computer implemented method of claim 1, further comprising generating a set of sub-bands for the audio signal according to a critical, octave, mel, or bark band spacing technique.

10. A system for audio bandwidth dependent noise suppression comprising:

an audio bandwidth detector to detect the audio bandwidth of an audio signal responsive to one or more audio indicators;

a noise suppression gain calculator to calculate noise suppression gains responsive to the audio signal;

a noise suppression gain modifier to modify the noise suppression gains responsive to the detected audio bandwidth; and a noise suppression gain applier to apply the modified noise suppression gains to the audio signal where the audio indicators comprise one or more of a compression format associated with the audio signal and a data rate associated with the compression format.

11. The system for audio bandwidth dependent noise suppression of claim 10, where the audio indicators comprise one or more of an audio sample rate associated with the audio signal, a compression format associated with the audio signal and a data rate associated with the compression format.

12. The system for audio bandwidth dependent noise suppression of claim 11, where the compression format comprise one or more of Adaptive Multi-Rate, Enhanced Variable Rate Codec B and Motion Pictures Expert Group Advanced Audio Coding.

13. The system for audio bandwidth dependent noise suppression of claim 10, where the noise suppression gain modifier to modify the noise suppression gains responsive to the detected audio bandwidth comprises limiting the magnitude of the noise suppression gains.

14. The system for audio bandwidth dependent noise suppression of claim 13, where limiting the magnitude of the noise suppression gains comprises increasing a magnitude limit of the noise suppression gains with increased detected audio bandwidth.

15. The system for audio bandwidth dependent noise suppression of claim 14, where the magnitude limit of the noise suppression gains comprises:

10 to 12 dB for detected audio bandwidth up to and including 4 kHz;

6 to 8 dB for detected audio bandwidth from 4 kHz up to and including 8 kHz; and 0 to 6 dB for detected audio bandwidth over 8 kHz.

16. The system for audio bandwidth dependent noise suppression of claim 10, further comprising:

where the audio bandwidth detector detects changes in the audio bandwidth of an audio signal responsive to one or more audio indicators; and where the noise suppression gain modifier modifies the noise suppression gains responsive to the changed detected audio bandwidth.

17. The system for audio bandwidth dependent noise suppression of claim 10, further comprising generating a set of sub-bands for the audio signal using a subband filter or a Fast Fourier Transform.

18. The system for audio bandwidth dependent noise suppression of claim 10, further comprising generating a set of sub-bands for the audio signal according to a critical, octave, mel, or bark band spacing technique.

19. A computer implemented method of noise suppression comprising:

detecting an audible bandwidth range of an audio signal received from a microphone responsive to one or more audio indicators identifying the audible bandwidth range through an audio bandwidth detector circuit;

calculating noise suppression gains responsive to the audio signal through a noise suppression gain calculator circuit;

modifying the noise suppression gains so that the noise suppression gains depend on the size of the detected audible bandwidth range through a noise suppression modifier circuit; and applying the modified noise suppression gains to the audio signal through a noise suppression gain applier circuit;

where the audio indicators comprise one or more of a compression format associated with the audio signal and a data rate associated with the compression format.

20. The method of claim 19 where at least one of the one or more audio indicators comprise an identifier of an audio sample rate.

21. The method of claim 19 where at least one of the one or more audio indicators comprise an identifier of a compression format.

* * * * *

UNITED STATES PATENT AND TRADEMARK OFFICE
CERTIFICATE OF CORRECTION

PATENT NO. : 9,349,383 B2
APPLICATION NO. : 13/752983
DATED : May 24, 2016
INVENTOR(S) : Phillip Alan Hetherington It is certified that error appears in the above-identified patent and that said Letters Patent is hereby corrected as shown below:

In the Claims

In column 6, claim 1, line 46, before “the audio indicators” replace “where” with --wherein--.

In column 8, claim 19, line 43, before “the audio indicators” replace “where” with --wherein--.

Signed and Sealed this
Twenty-third Day of August, 2016

Michelle K. Lee
*Director of the United States Patent and Trademark Office*